United States Patent
Chen et al.

(10) Patent No.: US 7,282,448 B2
(45) Date of Patent: *Oct. 16, 2007

(54) SUBSTRATE AND METHOD OF FORMING SUBSTRATE FOR FLUID EJECTION DEVICE

(75) Inventors: Chien-Hua Chen, Corvallis, OR (US); Donald W. Schulte, Corvallis, OR (US); Terry E McMahon, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 142 days.

This patent is subject to a terminal disclaimer.

(21) Appl. No.: 11/211,390

(22) Filed: Aug. 25, 2005

(65) Prior Publication Data

US 2005/0282331 A1   Dec. 22, 2005

Related U.S. Application Data

(62) Division of application No. 10/135,236, filed on Apr. 30, 2002, now Pat. No. 6,981,759.

(51) Int. Cl.
*H01L 21/302* (2006.01)
*H01L 21/461* (2006.01)

(52) U.S. Cl. ............... 438/689; 438/637; 438/700; 438/712; 438/8; 257/E21; 257/223; 257/245; 257/229

(58) Field of Classification Search ........ 438/689, 438/8, 634, 637, 700, 706, 712, 733, 734, 438/735, 692
See application file for complete search history.

(56) References Cited

U.S. PATENT DOCUMENTS

| | | |
|---|---|---|
| 4,455,192 A | 6/1984 | Tamai |
| 5,124,717 A | 6/1992 | Campanelli et al. |
| 5,141,596 A | 8/1992 | Hawkins et al. |
| 5,385,635 A | 1/1995 | O'Neill |
| 5,387,314 A | 2/1995 | Baughman et al. |
| 5,393,711 A | 2/1995 | Biallas et al. |
| 5,441,593 A | 8/1995 | Baughman et al. |
| 5,498,312 A | 3/1996 | Laermer et al. |

(Continued)

FOREIGN PATENT DOCUMENTS

DE    19538103 A1    4/1997

(Continued)

OTHER PUBLICATIONS

"Cryogenic Etching of Deep Narrow Trenches in Silicon"; by: Aachboun et al.; Journal of Vacuum Science & Technology A; vol. 18, No. 4; pt. 1-2; Jul.-Aug. 2000; Abstract Only.

(Continued)

*Primary Examiner*—David Nhu

(57) ABSTRACT

A method of forming an opening through a substrate having a first side and a second side opposite the first side includes forming spaced etch stops in the first side of the substrate, etching into the substrate from the second side toward the first side to the spaced etch stops, and etching into the substrate between the spaced etch stops from the second side. Etching into the substrate to the spaced etch stops includes forming a first portion of the opening and etching into the substrate between the spaced etch stops includes forming a second portion of the opening.

36 Claims, 8 Drawing Sheets

U.S. PATENT DOCUMENTS

| | | | |
|---|---|---|---|
| 5,501,893 | A | 3/1996 | Laermer et al. |
| 5,526,454 | A | 6/1996 | Mayer |
| 5,541,140 | A | 7/1996 | Goebel et al. |
| 5,716,633 | A | 2/1998 | O'Neil et al. |
| 5,756,901 | A | 5/1998 | Kurle et al. |
| 5,870,123 | A | 2/1999 | Lorenze, Jr. et al. |
| 6,008,138 | A | 12/1999 | Laermer et al. |
| 6,045,710 | A | 4/2000 | Silverbrook |
| 6,081,635 | A | 6/2000 | Hehmann |
| 6,096,656 | A | 8/2000 | Matzke et al. |
| 6,139,761 | A | 10/2000 | Ohkuma |
| 6,140,755 | A | 10/2000 | Neukermans et al. |
| 6,170,934 | B1 | 1/2001 | Fujisawa et al. |
| 6,305,080 | B1 | 10/2001 | Komuro et al. |
| 6,402,301 | B1 | 6/2002 | Powers et al. |
| 6,554,403 | B1* | 4/2003 | Chen et al. .................. 347/63 |
| 6,685,302 | B2 | 2/2004 | Haluzak et al. |
| 6,776,916 | B2* | 8/2004 | Hess ........................... 216/27 |
| 6,981,759 | B2* | 1/2006 | Chen et al. .................. 347/65 |
| 7,105,097 | B2* | 9/2006 | Hess ........................... 216/27 |
| 2003/0202049 | A1* | 10/2003 | Chen et al. .................. 347/63 |

FOREIGN PATENT DOCUMENTS

| | | |
|---|---|---|
| EP | 0865151 A2 | 9/1998 |
| EP | 0886307 A2 | 12/1998 |
| EP | 0978832 A2 | 2/2000 |
| GB | 2245366 A | 1/1992 |
| GB | 2290413 A | 12/1995 |
| GB | 2341348 A | 3/2000 |
| WO | WO 9837577 | 8/1998 |
| WO | WO 0023376 | 4/2000 |

OTHER PUBLICATIONS

"An Array of Hollow Microcapillaries For The Controlled Injection of Genetic Materials Into Animal/Plant Cells"; by: K. Chun et al.; (MEMS); Jan. 1999; Abstract Only.

"Deep Etching Key to the MEMS/MST Revolution"; by: Prashant Gadil; R & D; Jul. 1998; p. 38.

"Anisotropic Silicon Etch Characterization in the TFTL STS Etcher"; Aug. 20, 1999; pp. 1-5.

"Etching Characteristics And Profile Control in a Time Multiplexed Inductively Coupled Plasma Etcher"; by: AA Ayon et al. (EECS) Jun. 8-11, 1998; pp. 41-44.

"Characterization of a Time Multiplexed Inductively Coupled Plasma Etcher"; by: AA Ayon et al.; Journal of the Electrochemical Society; 146(1); 1999; pp. 339-349.

"STS-Surface Technology Systems-1st ASE Users Meeting," pp. 1-10; Advanced Silicon Etch, pp. 1-28; Technology Review, pp. 1-10; California, 1997.

"High-Aspect-Ratio Si Etching for Microsensor Fabrication"; by: W.H Juan & SW Pang; Journal of Vacuum Science & Technology A; vol. 13, No. 3; 1995; pp. 834-838.

"Bosch Deep Silicon Etching: Improved Uniformity and Etch Rate for Advanced MEMS Applications"; by: F Laermer et al.; 0-7803-5194-00; 1999; pp. 211-216.

"Advanced Silicon Etching Using High Density Plasmas"; by: JK Bhardwaj & H Ashraf; SPIE; vol. 2639; Oct. 1995; pp. 224-233.

"Recent Advances in Silicon Etching for MEMS Using the ASE Process"; by: AM Hynes et al.; Sensors And Actuators; vol. 74; 1999; pp. 13-17.

"Fabrication of Thick Silicon Dioxide Layers Using DRIE, Oxidation and Trench Refill"; by: C Zhang et al.; 15th IEEE Conference; Jan. 20-24, 2002; pp. 160-163.

"Fabrication of Out-of-Plane Curveo Surfaces in SI by Utilizing RIE Lag"; by: TA Chou et al.; 15th IEEE Conference; Jan. 20-24, 2002; pp. 145-148.

\* cited by examiner

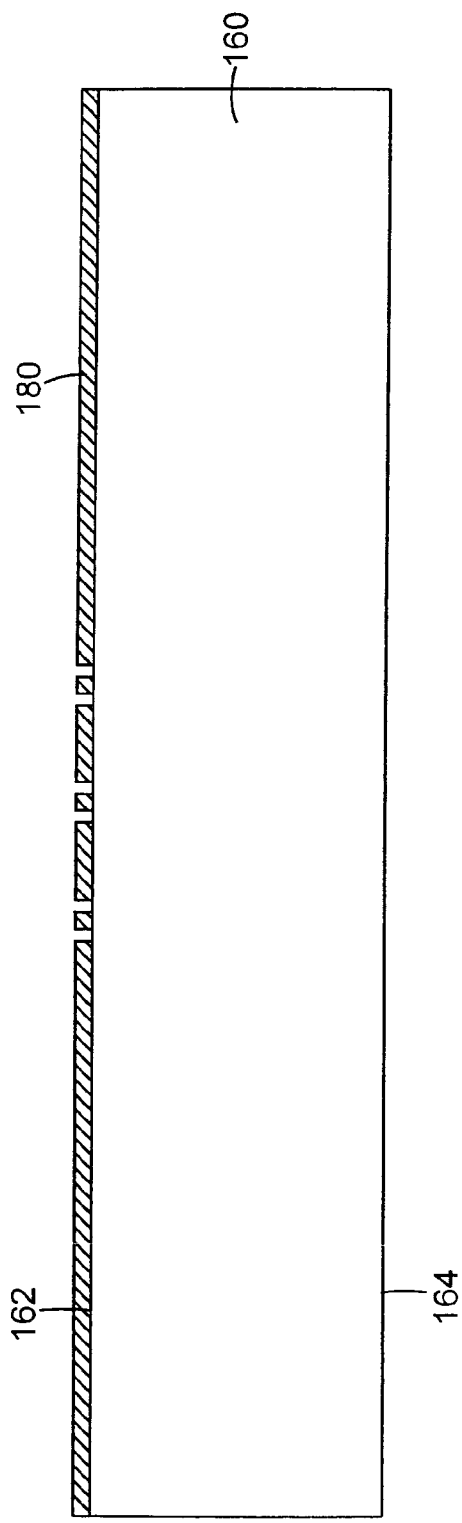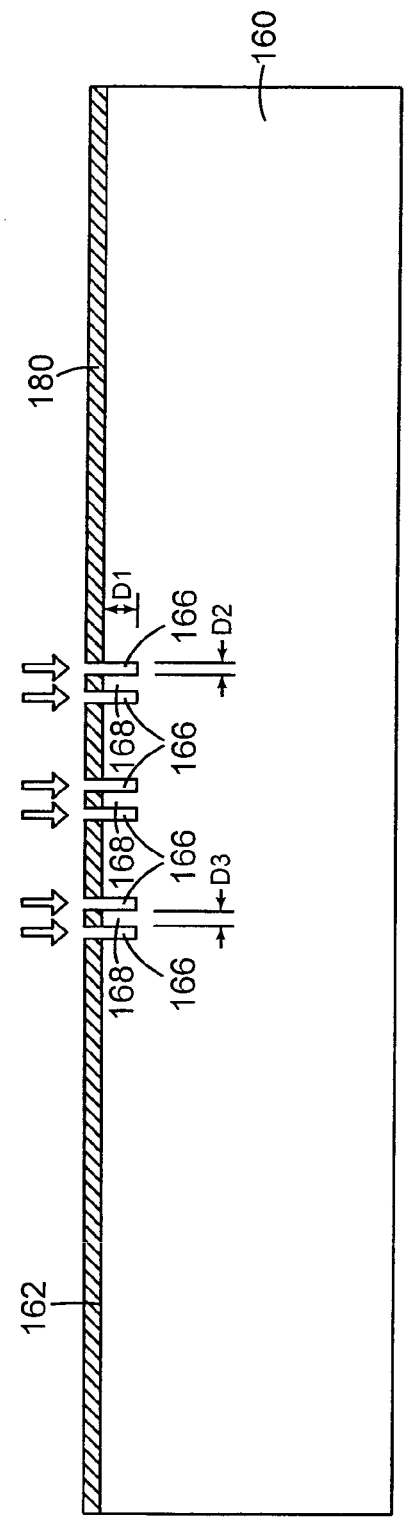

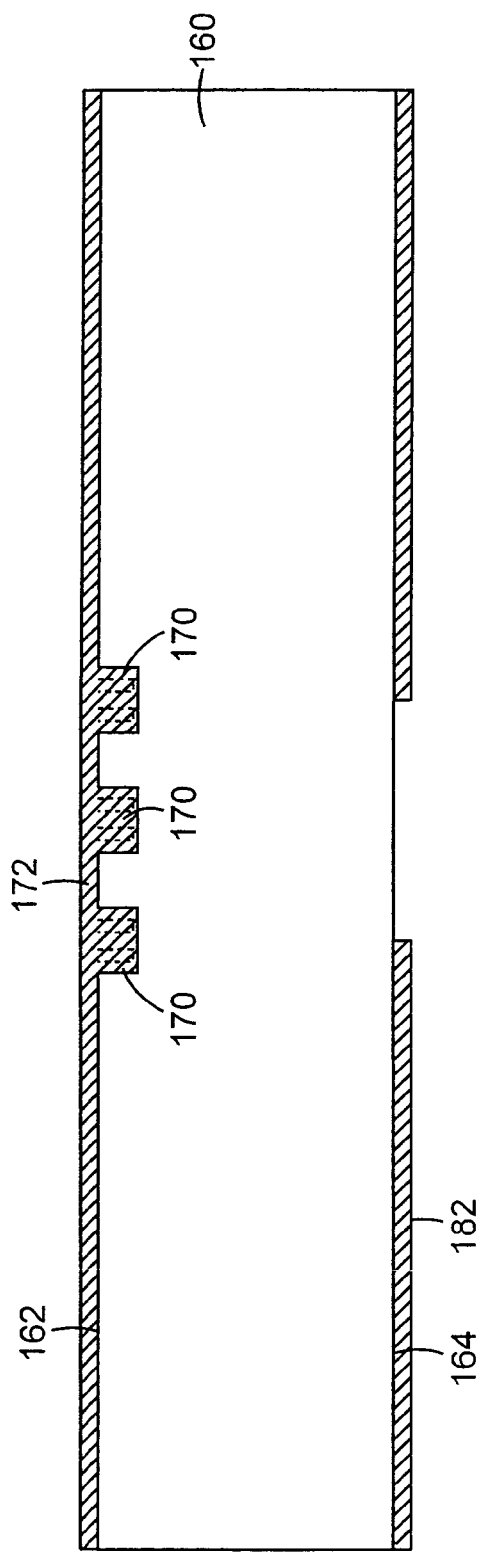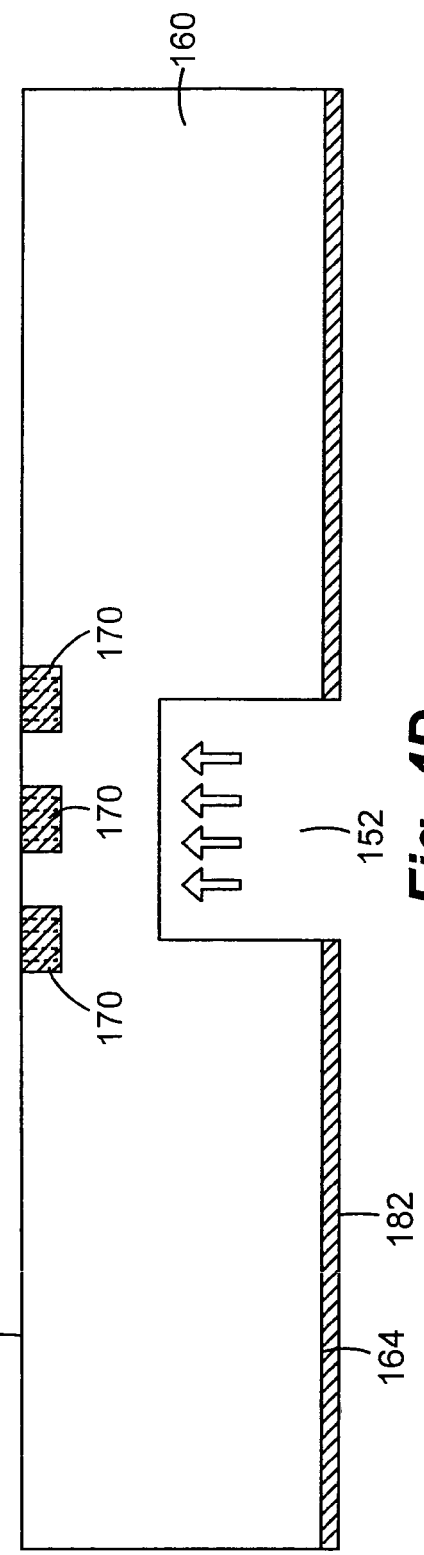

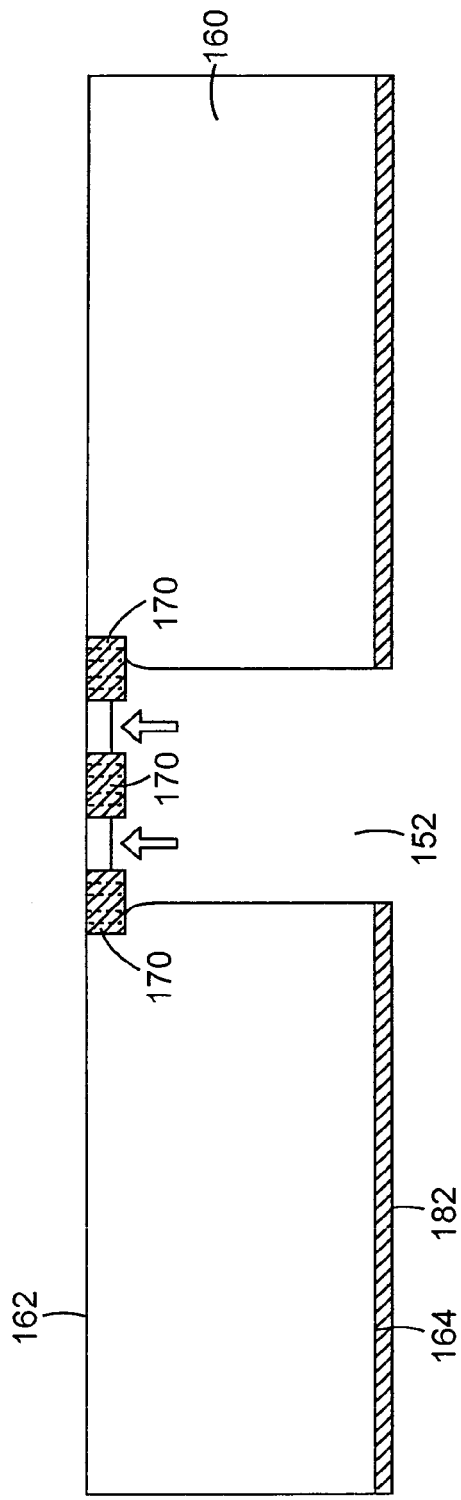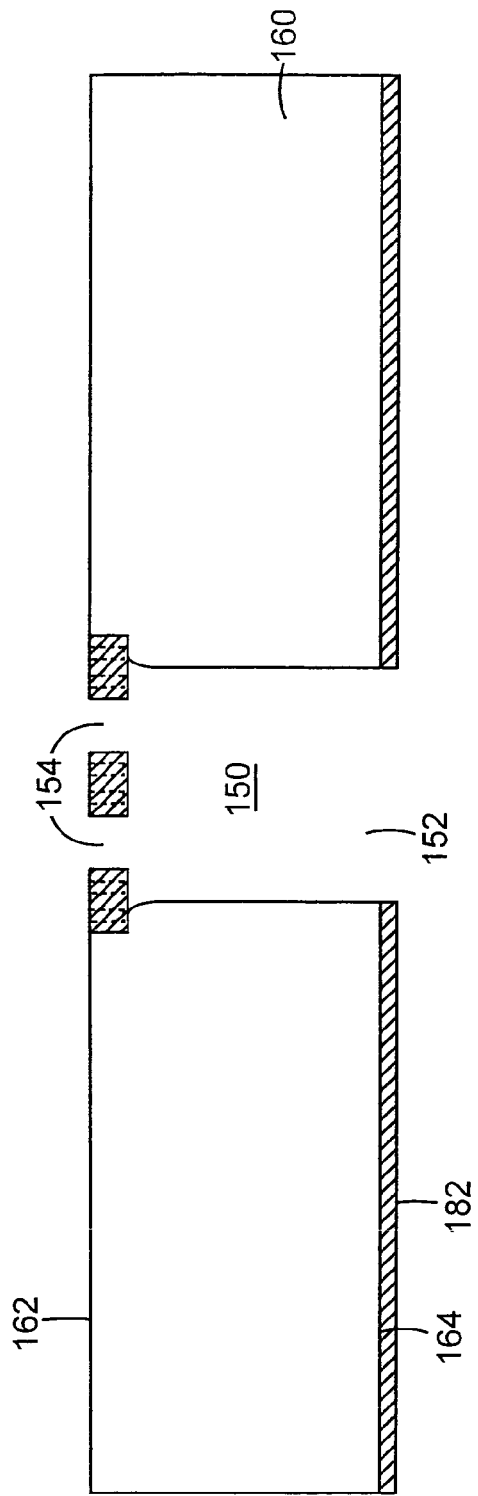

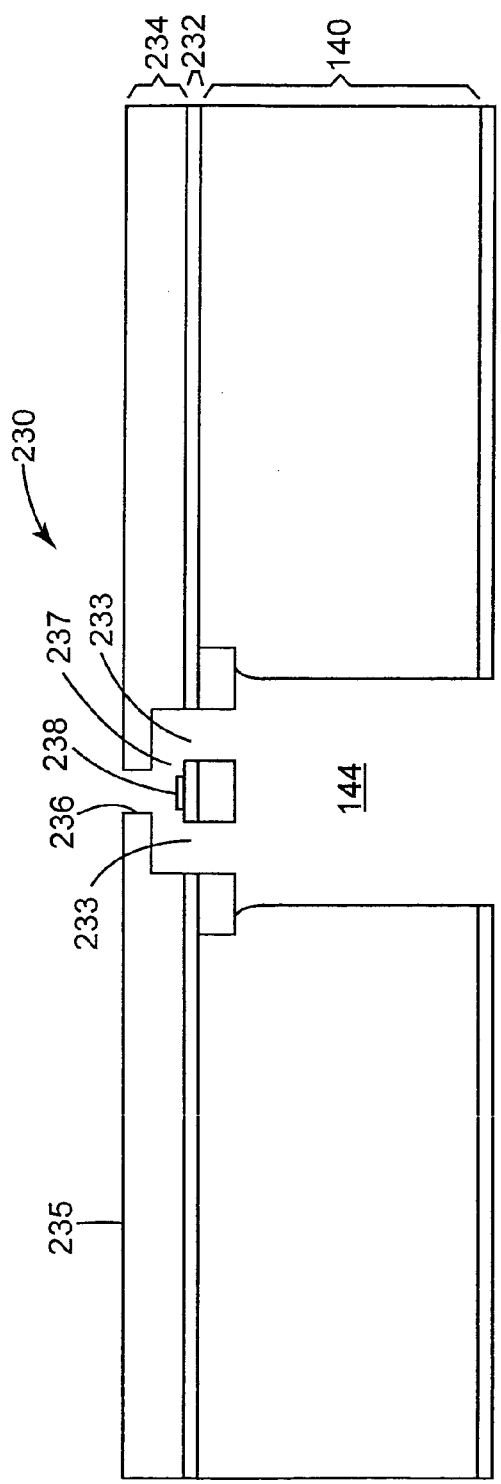
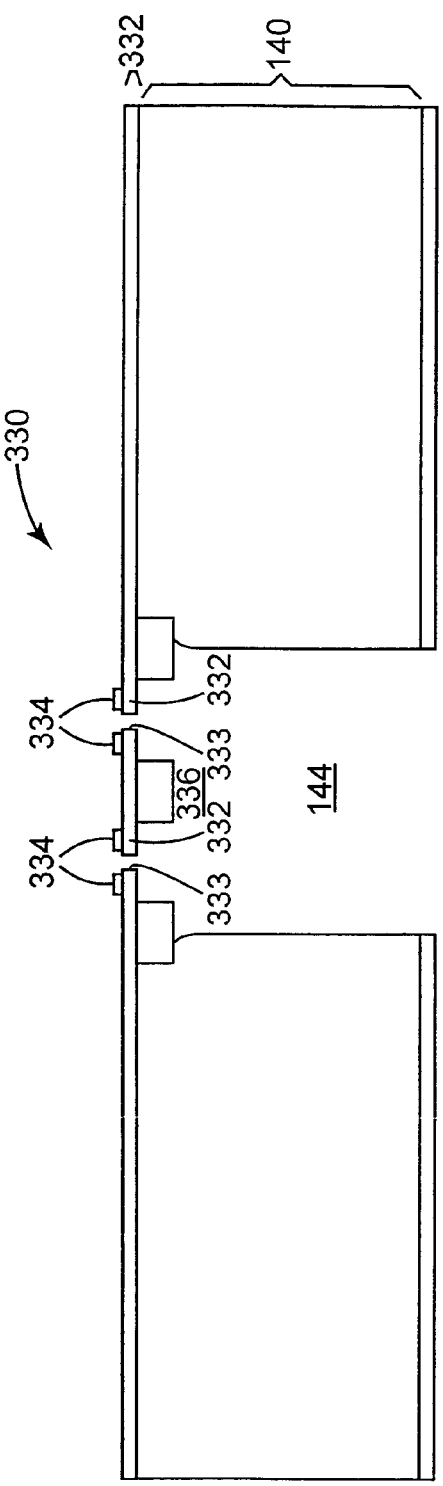

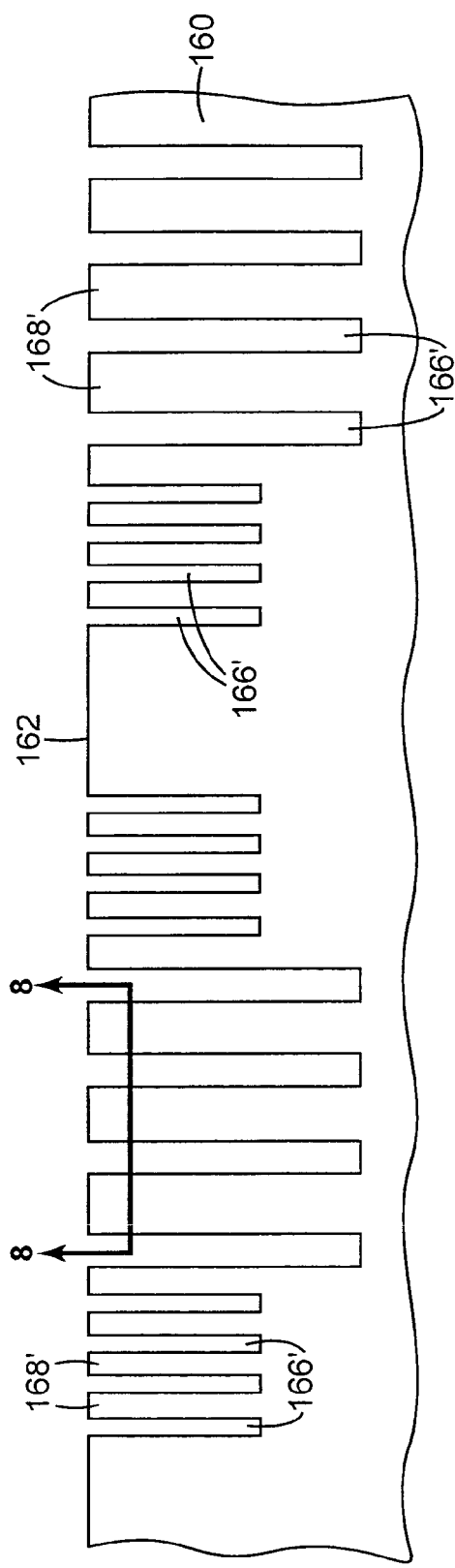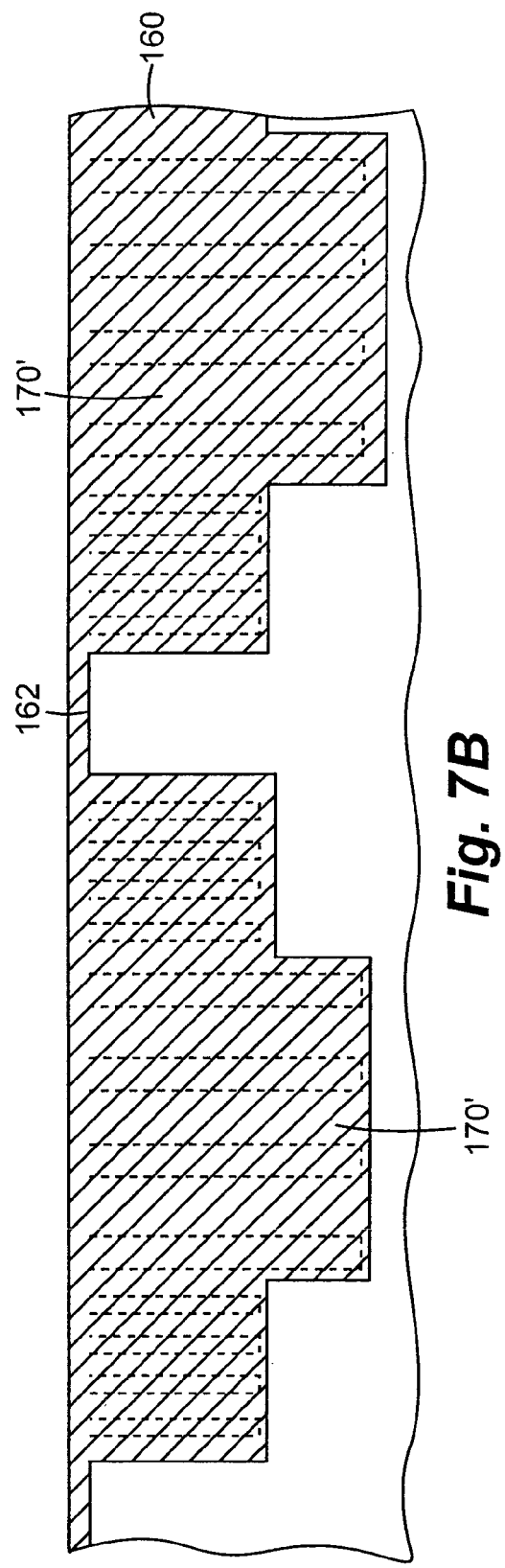

SUBSTRATE AND METHOD OF FORMING SUBSTRATE FOR FLUID EJECTION DEVICE

CROSS-REFERENCE TO RELATED APPLICATIONS

This application is a Divisional of U.S. patent application Ser. No. 10/135,236, filed on Apr. 30, 2002 now U.S. Pat. No. 6,981,759 which is incorporated herein by reference.

THE FIELD OF THE INVENTION

The present invention relates generally to fluid ejection devices, and more particularly to a substrate for a fluid ejection device.

BACKGROUND OF THE INVENTION

In some fluid ejection devices, such as printheads, a drop ejecting element is formed on a front side of a substrate and fluid is routed to an ejection chamber of the drop ejecting element through an opening or slot in the substrate. Often, the substrate is a silicon wafer and the slot is formed in the wafer by chemical etching. Existing methods of forming the slot through the substrate include etching into the substrate from a backside of the substrate to the front side of the substrate. The backside of the substrate is defined as a side of the substrate opposite of which the drop ejecting element is formed.

Unfortunately, etching into the substrate from the backside all the way to the front side may result in misalignment of the slot at the front side and/or varying width of the slot at the front side. For example, transferring the intended location of the slot at the front side of the substrate to the backside of the substrate may be inaccurate, thereby resulting in misalignment of the slot between the backside and the front side of the substrate. Such misalignment may result, for example, in undercutting of one or more layers formed on the front side of the substrate. As such, undercutting at the front side of the substrate may result in varying width of the substrate at the front side.

Accordingly, it is desired to control a width of the slot through the substrate at the front side thereof.

SUMMARY OF THE INVENTION

One aspect of the present invention provides a method of forming an opening through a substrate having a first side and a second side opposite the first side. The method includes forming spaced etch stops in the first side of the substrate, etching into the substrate from the second side toward the first side to the spaced etch stops, and etching into the substrate between the spaced etch stops from the second side. Etching into the substrate to the spaced etch stops includes forming a first portion of the opening and etching into the substrate between the spaced etch stops includes forming a second portion of the opening.

BRIEF DESCRIPTION OF THE DRAWINGS

FIGS. 4A-4F illustrate one embodiment of forming an opening through a substrate according to the present invention.

FIG. 5 is a schematic cross-sectional view illustrating another embodiment of a fluid ejection device formed on one embodiment of a substrate according to the present invention.

FIG. 6 is a schematic cross-sectional view illustrating another embodiment of a fluid ejection device formed on one embodiment of a substrate according to the present invention.

FIGS. 7A and 7B illustrate another embodiment of forming spaced etch stops in a substrate according to the present invention.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
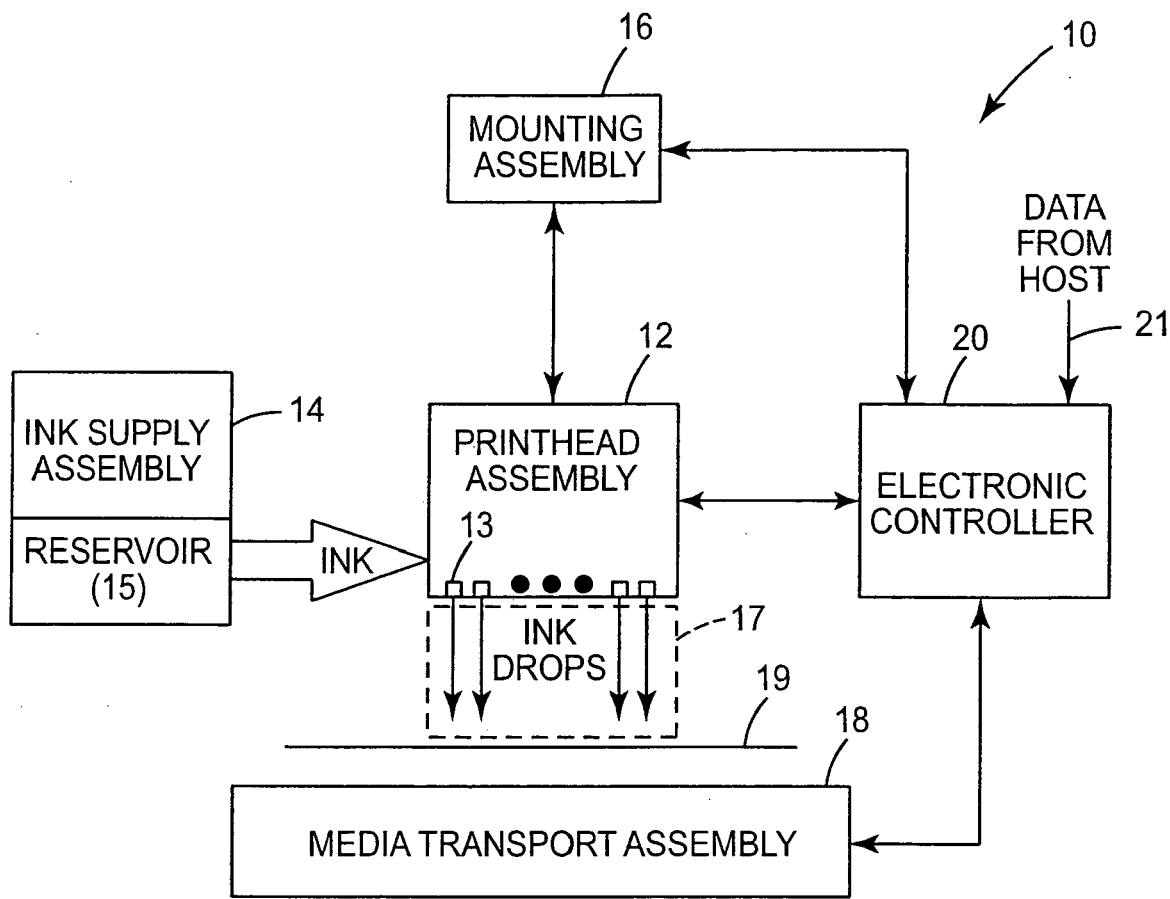
FIG. 1 is a block diagram illustrating one embodiment of an inkjet printing system according to the present invention.

FIG. 1 illustrates one embodiment of an inkjet printing system 10 according to the present invention. Inkjet printing system 10 constitutes one embodiment of a fluid ejection system which includes a fluid ejection assembly, such as an inkjet printhead assembly 12, and a fluid supply assembly, such as an ink supply assembly 14. In the illustrated embodiment, inkjet printing system 10 also includes a mounting assembly 16, a media transport assembly 18, and an electronic controller 20. Inkjet printhead assembly 12, as one embodiment of a fluid ejection assembly, is formed according to an embodiment of the present invention, and includes one or more printheads or fluid ejection devices which eject drops of ink or fluid through a plurality of orifices or nozzles 13. In one embodiment, the drops are directed toward a medium, such as print medium 19, so as to print onto print medium 19. Print medium 19 is any type of suitable sheet material, such as paper, card stock, transparencies, Mylar, and the like. Typically, nozzles 13 are arranged in one or more columns or arrays such that properly sequenced ejection of ink from nozzles 13 causes, in one embodiment, characters, symbols, and/or other graphics or images to be printed upon print medium 19 as inkjet printhead assembly 12 and print medium 19 are moved relative to each other.

Ink supply assembly 14, as one embodiment of a fluid supply assembly, supplies ink to printhead assembly 12 and includes a reservoir 15 for storing ink. As such, in one embodiment, ink flows from reservoir 15 to inkjet printhead assembly 12. In this embodiment, ink supply assembly 14 and inkjet printhead assembly 12 can form either a one-way ink delivery system or a recirculating ink delivery system. In a one-way ink delivery system, substantially all of the ink supplied to inkjet printhead assembly 12 is consumed during printing. In a recirculating ink delivery system, however, only a portion of the ink supplied to printhead assembly 12 is consumed during printing. As such, a portion of the ink not consumed during printing is returned to ink supply assembly 14.

In one embodiment, inkjet printhead assembly 12 and ink supply assembly 14 are housed together in an inkjet or fluidjet cartridge or pen. In another embodiment, ink supply assembly 14 is separate from inkjet printhead assembly 12 and supplies ink to inkjet printhead assembly 12 through an interface connection, such as a supply tube. In either embodiment, reservoir 15 of ink supply assembly 14 may be removed, replaced, and/or refilled. In one embodiment, where inkjet printhead assembly 12 and ink supply assembly 14 are housed together in an inkjet cartridge, reservoir 15 includes a local reservoir located within the cartridge and/or a larger reservoir located separately from the cartridge. As such, the separate, larger reservoir serves to refill the local reservoir. Accordingly, the separate, larger reservoir and/or the local reservoir may be removed, replaced, and/or refilled.

Mounting assembly 16 positions inkjet printhead assembly 12 relative to media transport assembly 18 and media transport assembly 18 positions print medium 19 relative to inkjet printhead assembly 12. Thus, a print zone 17 is defined adjacent to nozzles 13 in an area between inkjet printhead assembly 12 and print medium 19. In one embodiment, inkjet printhead assembly 12 is a scanning type printhead assembly. As such, mounting assembly 16 includes a carriage for moving inkjet printhead assembly 12 relative to media transport assembly 18 to scan print medium 19. In another embodiment, inkjet printhead assembly 12 is a non-scanning type printhead assembly. As such, mounting assembly 16 fixes inkjet printhead assembly 12 at a prescribed position relative to media transport assembly 18. Thus, media transport assembly 18 positions print medium 19 relative to inkjet printhead assembly 12.

Electronic controller 20 communicates with inkjet printhead assembly 12, mounting assembly 16, and media transport assembly 18. Electronic controller 20 receives data 21 from a host system, such as a computer, and includes memory for temporarily storing data 21. Typically, data 21 is sent to inkjet printing system 10 along an electronic, infrared, optical or other information transfer path. Data 21 represents, for example, a document and/or file to be printed. As such, data 21 forms a print job for inkjet printing system 10 and includes one or more print job commands and/or command parameters.

In one embodiment, electronic controller 20 provides control of inkjet printhead assembly 12 including timing control for ejection of ink drops from nozzles 13. As such, electronic controller 20 defines a pattern of ejected ink drops which form characters, symbols, and/or other graphics or images on print medium 19. Timing control and, therefore, the pattern of ejected ink drops, is determined by the print job commands and/or command parameters. In one embodiment, logic and drive circuitry forming a portion of electronic controller 20 is located on inkjet printhead assembly 12. In another embodiment, logic and drive circuitry is located off inkjet printhead assembly 12.

Figure 2:
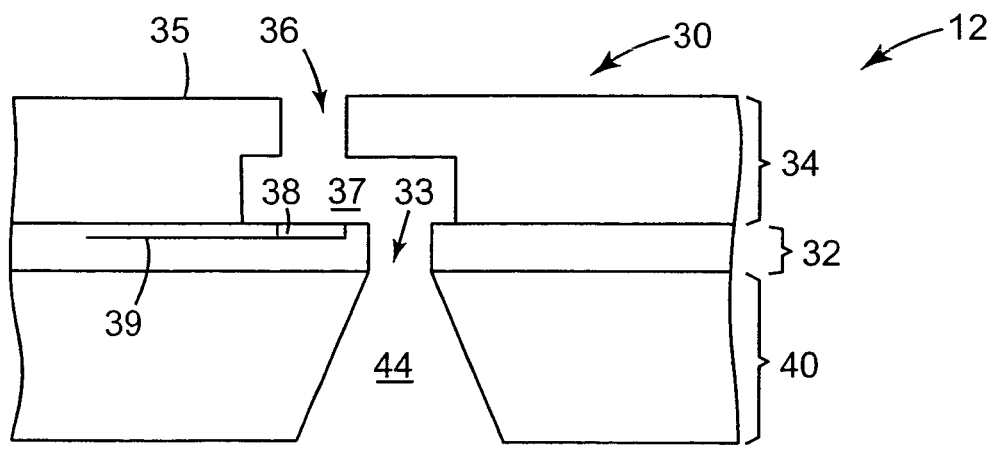
FIG. 2 is a schematic cross-sectional view illustrating one embodiment of a portion of a fluid ejection device according to the present invention.

FIG. 2 illustrates one embodiment of a portion of inkjet printhead assembly 12. Inkjet printhead assembly 12, as one embodiment of a fluid ejection assembly, includes an array of drop ejecting elements 30. Drop ejecting elements 30 are formed on a substrate 40 which has a fluid (or ink) feed slot 44 formed therein. As such, fluid feed slot 44 provides a supply of fluid (or ink) to drop ejecting elements 30.

In one embodiment, each drop ejecting element 30 includes a thin-film structure 32, an orifice layer 34, and a firing resistor 38. Thin-film structure 32 has a fluid (or ink) feed channel 33 formed therein which communicates with fluid feed slot 44 of substrate 40. Orifice layer 34 has a front face 35 and a nozzle opening 36 formed in front face 35. Orifice layer 34 also has a nozzle chamber 37 formed therein which communicates with nozzle opening 36 and fluid feed channel 33 of thin-film structure 32. Firing resistor 38 is positioned within nozzle chamber 37 and includes leads 39 which electrically couple firing resistor 38 to a drive signal and ground.

In one embodiment, during operation, fluid flows from fluid feed slot 44 to nozzle chamber 37 via fluid feed channel 33. Nozzle opening 36 is operatively associated with firing resistor 38 such that droplets of fluid are ejected from nozzle chamber 37 through nozzle opening 36 (e.g., normal to the plane of firing resistor 38) and toward a medium upon energization of firing resistor 38.

Example embodiments of inkjet printhead assembly 12 include a thermal printhead, a piezoelectric printhead, a flex-tensional printhead, or any other type of fluid ejection device known in the art. In one embodiment, inkjet printhead assembly 12 is a fully integrated thermal inkjet printhead. As such, substrate 40 is formed, for example, of silicon, glass, or a stable polymer, and thin-film structure 32 is formed by one or more passivation or insulation layers of silicon dioxide, silicon carbide, silicon nitride, tantalum, poly-silicon glass, or other suitable material. Thin-film structure 32 also includes a conductive layer which defines firing resistor 38 and leads 39. The conductive layer is formed, for example, by aluminum, gold, tantalum, tantalum-aluminum, or other metal or metal alloy.

Figure 3:
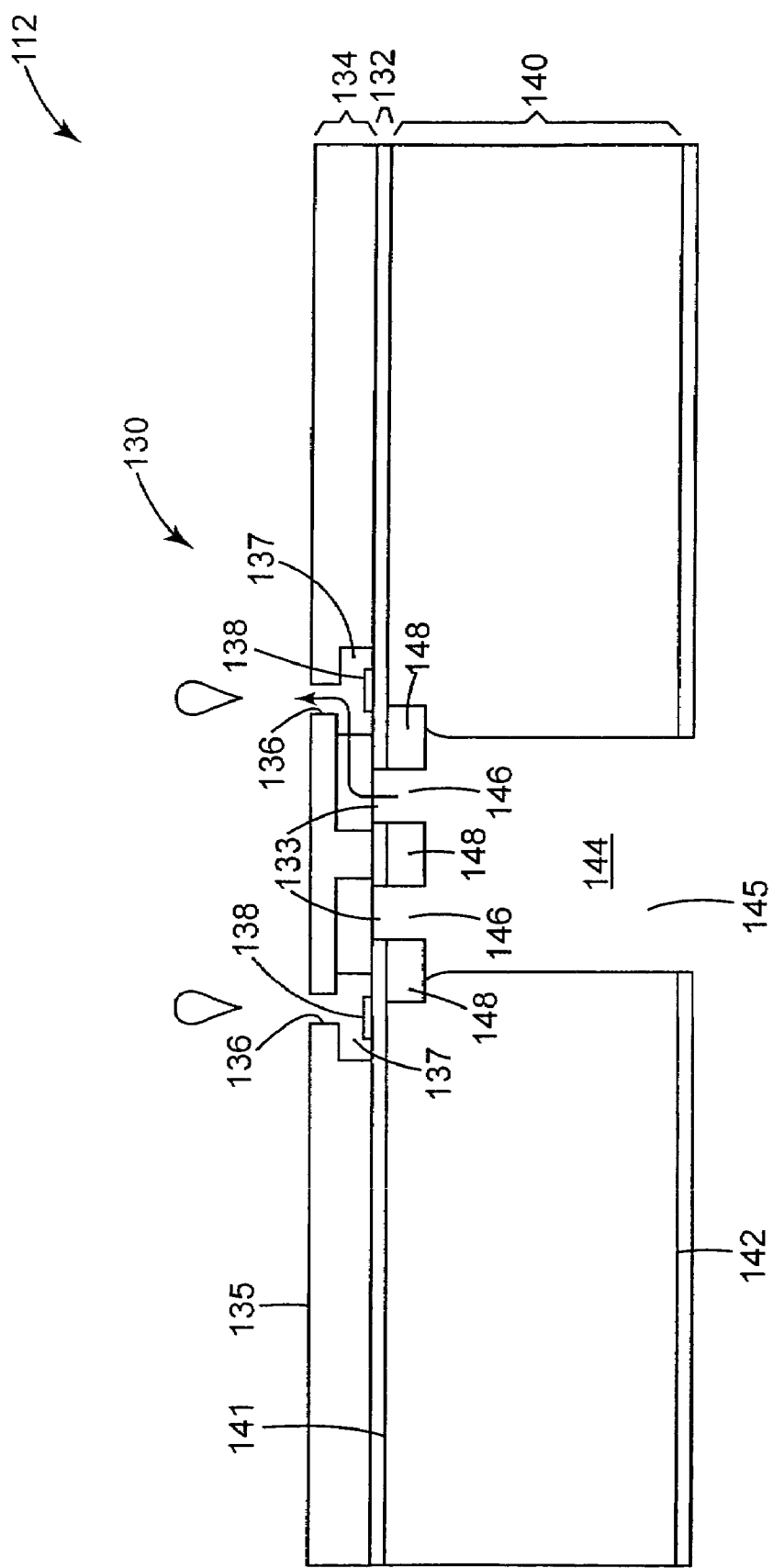
FIG. 3 is a schematic cross-sectional view illustrating one embodiment of a fluid ejection device formed on one embodiment of a substrate according to the present invention.

FIG. 3 illustrates another embodiment of a portion of inkjet printhead assembly 12. Inkjet printhead assembly 112, as another embodiment of a fluid ejection assembly, includes an array of drop ejecting elements 130. Drop ejecting elements 130 are formed on a substrate 140 which has a fluid (or ink) feed slot 144 formed therein. As such, fluid feed slot 144 provides a supply of fluid (or ink) to drop ejecting elements 130.

In one embodiment, drop ejecting elements 130 include a thin-film structure 132, an orifice layer 134, and firing resistors 138. Thin-film structure 132 has fluid (or ink) feed channels 133 formed therein which communicate with fluid feed slot 144 of substrate 140. Orifice layer 134 has a front face 135 and nozzle openings 136 formed in front face 135. Orifice layer 134 also has nozzle chambers 137 formed therein which communicate with respective nozzle openings 136 and respective fluid feed channels 133 of thin-film structure 132.

In one embodiment, during operation, fluid flows from fluid feed slot 144 to nozzle chambers 137 via respective fluid feed channels 133. Nozzle openings 136 are operatively associated with respective firing resistors 138 such that droplets of fluid are ejected from nozzle chambers 137 through nozzle openings 136 and toward a medium upon energization of firing resistors 138 positioned within respective nozzle chambers 137.

As illustrated in the embodiment of FIG. 3, substrate 140 has a first side 141 and a second side 142. Second side 142 is opposite of first side 141 and, in one embodiment, oriented substantially parallel with first side 141. Fluid feed slot 144 communicates with first side 141 and second side 142 of substrate 140 so as to provide a channel or passage through substrate 140.

In one embodiment, fluid feed slot 144 includes a first portion 145 and a second portion 146. First portion 145 communicates with second side 142 of substrate 140 and second portion 146 communicates with first side 141 of substrate 140. First portion 145 and second portion 146 communicate with each other so as to form fluid feed slot 144 through substrate 140. Fluid feed slot 144, including first portion 145 and second portion 146, is formed in substrate 140 according to an embodiment of the present invention. In one embodiment, fluid feed slot 144, including first portion 145 and second portion 146, is formed in substrate 140 by chemical etching, as described below.

In one embodiment, substrate 140 includes spaced stops 148. Stops 148 are formed in first side 141. Stops 148 control etching of substrate 140 and, therefore, formation of first portion 145 and second portion 146 of fluid feed slot 144. As such, stops 148 are formed of a material which is resistant to etchant used for etching substrate 140, as described below. Thus, stops 148 constitute etch stops of substrate 140.

Stops 148 define and control formation of fluid feed slot 144 in substrate 140. More specifically, stops 148 define a maximum dimension of second portion 146 of fluid feed slot 144 and establish a location of second portion 146 at first side 141. As such, stops 148 accommodate misalignment between first portion 145 and a location of second portion 146 at first side 141 and provide for self-alignment of fluid feed slot 144 through substrate 140, as described below. In addition, stops 148 support thin-film structure 132 and prevent etching or undercutting under thin-film structure 132 in areas adjacent fluid feed slot 144, as described below.

FIGS. 4A-4F illustrate one embodiment of forming an opening 150 through a substrate 160. In one embodiment, substrate 160 is a silicon substrate and opening 150 is formed in substrate 160 by chemical etching, as described below. Substrate 160 has a first side 162 and a second side 164. Second side 164 is opposite of first side 162 and, in one embodiment, oriented substantially parallel with first side 162. Opening 150 communicates with first side 162 and second side 164 of substrate 160 so as to provide a channel or passage through substrate 160. While only one opening 150 is illustrated as being formed in substrate 160, it is understood that any number of openings 150 may be formed in substrate 160.

In one embodiment, substrate 160 represents substrate 140 of inkjet printhead assembly 112 and opening 150 represents fluid feed slot 144 formed in substrate 140. As such, drop ejecting elements 130 of inkjet printhead assembly 112 are formed on first side 162 of substrate 160. Thus, first side 162 forms a front side of substrate 160 and second side 164 forms a backside of substrate 160 such that fluid flows through opening 150 and, therefore, substrate 160 from the backside to the front side. Accordingly, opening 150 provides a fluidic channel for the communication of ink with drop ejecting elements 130 through substrate 160.

As illustrated in the embodiment of FIGS. 4A-4C, before opening 150 is formed, etch stops 170 are formed in substrate 160. In one embodiment, etch stops 170 are formed in substrate 160 by chemical etching into substrate 160 and growing an oxide in substrate 160, as described below.

In one embodiment, as illustrated in the embodiment of FIG. 4A, to form etch stops 170 in substrate 160, a masking layer 180 is formed on substrate 160. More specifically, masking layer 180 is formed on first side 162 of substrate 160. Masking layer 180 is used to selectively control or block etching of first side 162. As such, masking layer 180 is formed along first side 162 of substrate 160 and patterned to expose areas of first side 162 and define where etch stops 170 are to be formed in substrate 160.

In one embodiment, masking layer 180 is formed by deposition and patterned by photolithography and etching to define exposed portions of first side 162 of substrate 160. More specifically, masking layer 180 is patterned to outline where slots 166 (FIG. 4B) are to be formed in substrate 160 from first side 162. Preferably, slots 166 are formed in substrate 160 by chemical etching, as described below. Thus, masking layer 180 is formed of a material which is resistant to etchant used for etching slots 166 into substrate 160. Examples of a material suitable for masking layer 180 include silicon dioxide, silicon nitride, or photoresist.

Next, as illustrated in the embodiment of FIG. 4B, slots 166 are formed in substrate 160. Slots 166 are spaced along first side 162 so as to define where opening 150 is to communicate with first side 162. Preferably, slots 166 are oriented substantially perpendicular to first side 162. In one embodiment, slots 166 include multiple groupings of slots spaced from each other along first side 162.

Slots 166 are formed by selectively removing spaced portions of substrate 160 from first side 162. By removing spaced portions of substrate 160 and forming slots 166, pillars or posts 168 which extend to first side 162 are defined between the removed portions of substrate 160.

In one embodiment, slots 166 are formed in substrate 160 by etching into first side 162. Preferably, slots 166 are formed in substrate 160 using an anisotropic etch process which forms slots 166 with substantially parallel sides. In one embodiment, the etch process is a dry etch, such as a plasma based fluorine ($SF_6$) etch. In a particular embodiment, the dry etch is a reactive ion etch (RIE) and, more specifically, a deep RIE (DRIE).

During the deep RIE, an exposed section is alternatively etched with a reactive etching gas and coated until a slot is formed. In one exemplary embodiment, the reactive etching gas creates a fluorine radical that chemically and/or physically etches the substrate. In this exemplary embodiment, a polymer coating that is selective to the etchant used is deposited on inside surfaces of the forming slot, including the sidewalls and bottom. The coating is created by using carbon-fluorine gas that deposits $(CF_2)n$, a Teflon-like material or Teflon-producing monomer, on these surfaces. In this embodiment, the polymer substantially prevents etching of the sidewalls during the subsequent etch(es). The gases for the etchant alternate with the gases for forming the coating on the inside of the slots.

After slots 166 are formed in substrate 160, masking layer 180 is stripped or removed from substrate 160. As such, first side 162 of substrate 160 is revealed or exposed. In one embodiment, when masking layer 180 is formed of an oxide, masking layer 180 is removed, for example, by a chemical etch. In another embodiment, when masking layer 180 is formed of photoresist, masking layer 180 is removed, for example, by a resist stripper.

In one embodiment, slots 166 have a first dimension D1 and a second dimension D2. First dimension D1 is oriented substantially perpendicular to first side 162 and second dimension D2 is oriented substantially perpendicular to first dimension D1. Preferably, first dimension D1 is greater than second dimension D2. In addition, slots 166 are spaced such that posts 168 have a dimension D3. Dimension D3 is also oriented substantially perpendicular to first dimension D1.

As illustrated in the embodiment of FIG. 4C, after slots 166 are formed in substrate 160, etch stops 170 are formed in substrate 160 and a masking layer 182 is formed on second side 164. In one embodiment, forming etch stops 170 in substrate 160 includes filling slots 166 and forming a layer 172 on first side 162. Masking layer 182 is patterned to expose an area of second side 164 and define where substrate 160 is to be etched to form a first portion 152 of opening 150 (FIGS. 4D-4F).

In one embodiment, etch stops 170 (including layer 172) and masking layer 182 are formed by growing an oxide in slots 166 so as to fill slots 166 and on first side 162, and on second side 164. The oxide is resistant to etchant selected for use in etching opening 150 through substrate 160, as described below. As such, the oxide may include, for example, thermally grown silicon dioxide ($SiO_2$).

Preferably, growing the oxide in slots 166 includes consuming portions of substrate 160. More specifically, the oxide consumes portions of substrate 160 adjacent to and/or expanding outwardly from slots 166. For example, the oxide consumes pillars or posts 168 provided between slots 166, as well as portions of substrate 160 beside and/or below slots 166. As such, etch stops 170 include portions of substrate 160 adjacent to slots 166. Preferably, a ratio of the width of posts 168, namely dimension D3, to the width of slots 166, namely dimension D2, is selected such that growing the oxide includes filling slots 166 with oxide and consuming posts 168 by oxide. Thus, by forming multiple spaced slots 166 in substrate 160 and thermally growing oxide so as to fill slots 166 as well as consume posts 168 between slots 166, a uniform oxide layer is formed in localized regions of substrate 160.

As illustrated in the embodiment of FIG. 4D, after etch stops 170 are formed in substrate 160, layer 172 is removed from first side 162. Layer 172 is removed, for example, by a buffered oxide etch (BOE) or chemo-mechanical polishing (CMP). Etch stops 170, however, remain buried in substrate 160. With layer 172 removed from first side 162, additional layers including, for example, thin-film structure 132 and orifice layer 134 may be formed on substrate 160.

Also, as illustrated in the embodiment of FIG. 4D, first portion 152 of opening 150 is etched into substrate 160 from second side 164. As such, first portion 152 of opening 150 is formed by etching an exposed portion or area of substrate 160 from second side 164 toward first side 162.

Next, as illustrated in the embodiment of FIG. 4E, etching into substrate 160 from second side 164 toward first side 162 continues such that first portion 152 of opening 150 is formed to etch stops 170. Thereafter, a second portion 154 of opening 150 is etched into substrate 160 from second side 164 through first portion 152 and between etch stops 170.

As illustrated in the embodiment of FIG. 4F, etching into substrate 160 from second side 164 through first portion 152 and between etch stops 170 continues to first side 162 such that second portion 154 of opening 150 is formed. As such, opening 150 is formed through substrate 160.

Preferably, opening 150, including first portion 152 and second portion 154, is formed using an anisotropic etch process which forms opening 150 with substantially parallel sides. In one embodiment, the etch process is a dry etch, such as a plasma based fluorine ($SF_6$) etch. In a particular embodiment, the dry etch is a reactive ion etch (RIE) and, more specifically, a deep RIE (DRIE), as described above.

When etching first portion 152 of opening 150 into substrate 160 from second side 164, etch stops 170 limit or establish a depth of first portion 152. As such, DRIE proceeds to etch stops 170. In addition, when etching second portion 154 into substrate 160 from first portion 152, etch stops 170 limit etching of substrate 160 to areas between etch stops 170 and prevent etching laterally of etch stops 170. As such, undercutting or etching into substrate 160 under one or more layers formed on first side 162 is avoided when etching to first side 162 from second side 164 through first portion 152. Rather, any undercutting is limited to under etch stops 170, as illustrated in the embodiments of FIGS. 4E and 4F. Thus, etch stops 170 define substantially vertical sidewalls of second portion 154 of opening 150 and control a width of opening 150 at first side 162. Etch stops 170, therefore, control where opening 150 communicates with first side 162.

As described above, etch stops 170 are formed of a material resistant to the etchant used to form opening 150. As such, etch stops 170 define a maximum dimension of second portion 154. In addition, etch stops 170 establish a location of second portion 154 at first side 162 and provide for self-alignment between first portion 152 and second portion 154. More specifically, etch stops 170 accommodate misalignment between first portion 152 formed from second side 164 and a location of second portion 154 at first side 162 by causing first portion 152 to terminate at etch stops 170 and confining second portion 154 to between spaced etch stops 170. As such, alignment of first portion 152 relative to second portion 154 may vary. For example, alignment of first portion 152 relative to second portion 154 may vary to the left or to the right (as defined in the figures), yet second portion 154 will be positioned in the desired location relative to first side 162.

FIG. 5 illustrates another embodiment of drop ejecting elements 130 formed on substrate 140. Similar to drop ejecting elements 130, drop ejecting elements 230 include a thin-film structure 232, an orifice layer 234, and a firing resistor 238. In addition, thin-film structure 232 has fluid (or ink) feed channels 233 formed therein which communicate with fluid feed slot 144 of substrate 140. Furthermore, orifice layer 234 has a front face 235 and a nozzle opening 236 formed in front face 235. Orifice layer 234, however, has a nozzle chamber 237 formed therein which communicates with nozzle opening 236 and fluid feed channels 233. Thus, during printing, fluid (or ink) flows from fluid feed slot 144 to nozzle chamber 237 via fluid feed channels 233.

FIG. 6 illustrates another embodiment of drop ejecting elements 130 formed on substrate 140. Drop ejecting elements 330 are formed as flextensional transducers and include a flexible membrane 332 and an actuator 334. Flexible membrane 332 is supported by substrate 140 so as to extend across or over fluid feed slot 144. As such, fluid feed slot 144 and flexible membrane 332 define a fluid reservoir 336. As described below, actuation of actuator 334 causes deflection of flexible membrane 332 which, in turn, causes ejection of fluid from fluid reservoir 336.

Flexible membrane 332 has an orifice 333 defined therein which communicates with fluid reservoir 336. As such, when fluid reservoir 336 is supplied with-fluid, the fluid communicates with orifice 333. Orifice 333 defines a nozzle for ejecting a quantity of fluid from fluid reservoir 336 in response to deflection of flexible membrane 332. Flexible membrane 332 is supported by substrate 140 such that a maximum deflection of flexible membrane 332 occurs at orifice 333 during a symmetric deflection mode. While flexible membrane 332 is illustrated as having two orifices 333, it is within the scope of the present invention for flexible membrane 332 to have any number of orifices 333 defined therein.

Flexible membrane 332 is formed of a flexible material such as, for example, a flexible thin film of silicon nitride or silicon carbide or flexible thin layer of silicon. In one embodiment, substrate 140 and flexible membrane 332 are formed of a homogeneous material such as, for example, silicon. As such, flexible membrane 332 is formed by a flexible thin layer of silicon extending across fluid reservoir 336.

Actuator 334 is associated with and causes deflection of flexible membrane 332. In one embodiment, actuator 334 is annular in shape and positioned symmetrically and, more specifically, concentrically with orifice 333. In another embodiment, actuator 334 is discontinuous, having multiple uncoupled sections positioned about orifice 333.

In one embodiment, actuator 334 is provided on a side of flexible membrane 332 opposite fluid reservoir 336. As such, actuator 334 is not in direct contact with fluid contained within fluid reservoir 336. Thus, potential affects of fluid contacting actuator 334, such as corrosion or electrical shorting, are reduced. In one embodiment, a passivation layer is provided over electrodes for actuator 334 to substantially protect the electrodes from the environment, including mechanical and chemical (ink) affects. While actuator 334 is illustrated as being provided on a side of flexible membrane 332 opposite fluid reservoir 336, it is within the scope of the present invention for actuator 334 to be provided on a side of flexible membrane 332 facing fluid reservoir 336.

In one embodiment, actuator 334 includes a piezoelectric material which changes shape, for example, expands and/or contracts, in response to an electrical signal. Thus, in response to the electrical signal, actuator 334 applies a force to flexible membrane 332 which causes flexible membrane 332 to deflect relative to substrate 140. As such, orifice 333 is located in an area of flexible membrane 332 which achieves maximum deflection when flexible membrane 332 deflects. Examples of a piezoelectric material include zinc oxide or a piezoceramic material such as barium titanate, lead zirconium titanate (PZT), or lead lanthanum zirconium titanate (PLZT). It is understood that actuator 334 may include any type of device which causes movement or deflection of flexible membrane 332 including an electrostatic, magnetostatic, and/or thermal expansion actuator.

When flexible membrane 332 deflects, a droplet of fluid is formed and ejected from orifice 333 of flexible membrane 332. Since flexible membrane 332 is supported about a periphery thereof, the largest deflection of flexible membrane 332 occurs at or near orifice 333. Cyclical application of an electrical signal to actuator 334 causes flexible membrane 332 to oscillate. Flexible membrane 332 has multiple resonant frequencies and, as such, may oscillate in different resonant vibrational modes. Preferably, flexible membrane 332 oscillates into a lowest order, symmetric resonant vibrational mode with maximum deflection occurring at orifice 333. Drop ejecting elements 330, therefore, eject droplets of fluid at a predetermined rate and/or at predetermined intervals.

FIGS. 7A and 7B illustrate another embodiment of forming etch stops 170 in substrate 160. As illustrated in the embodiment of FIG. 7A, an enlarged portion of substrate 160 has slots 166' formed therein. Preferably, slots 166' are formed in substrate 160 by etching into first side 162 of substrate 160 in a manner similar to that described above including, more specifically, DRIE. Slots 166', however, have varying depth and width.

A depth of slots 166' is varied by varying a width of slots 166'. More specifically, by increasing the width of slots 166', a depth of slots 166' is also increased. As such, slots 166' of varying depth can be formed in substrate 160 by varying the width thereof. In addition, pillars or posts 168' of varying width and length are formed between the removed portions of substrate 160 as slots 166' are formed. Furthermore, an etch rate of forming slots 166 is also varied by varying the width of slots 166'. More specifically, by increasing the width of slots 166', an etch rate of slots 166' is also increased. Thus, wider slots etch faster than narrower slots.

Next, as illustrated in the embodiment of FIG. 7B, etch stops 170' are formed in substrate 160. Preferably, etch stops 170' are formed by growing an oxide in slots 166', including on first side 162, in a manner similar to that described above, such that the oxide fills slots 166' and consumes posts 168'. However, because slots 166' are of varying depth, etch stops 170' are formed of varying depth. Thus, etch stops of varying thickness or depth may be formed in substrate 160.

Figure 8A:
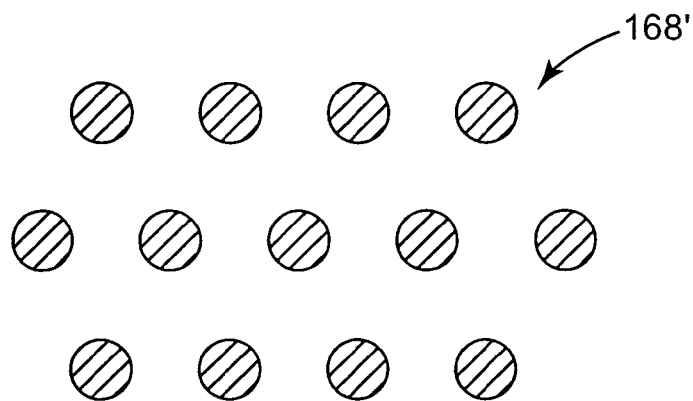
FIG. 8A is a cross-sectional view taken along line 8-8 of FIG. 7A illustrating one embodiment of a portion of the substrate of FIG. 7A.
Figure 8B:
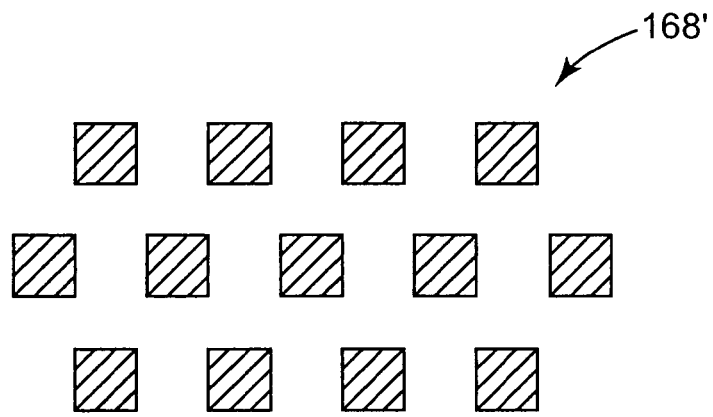
FIG. 8B is a cross-sectional view similar to FIG. 8A illustrating another embodiment of a portion of the substrate of FIG. 7A.
Figure 8C:
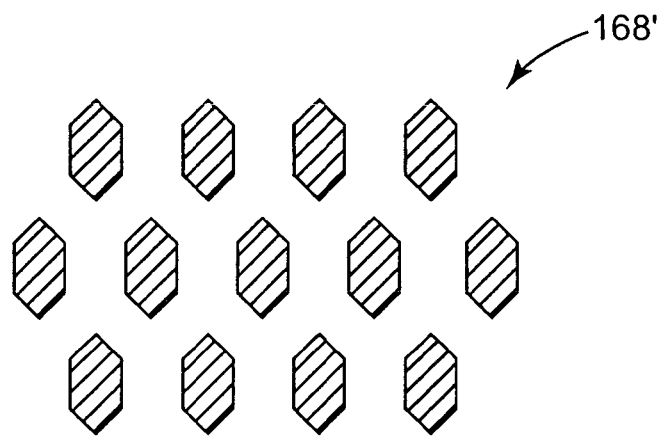
FIG. 8C is a cross-sectional view similar to FIG. 8A illustrating another embodiment of a portion of the substrate of FIG. 7A.

As illustrated in the embodiments of FIGS. 8A-8C, posts 168' may have circular and/or non-circular cross-sectional shapes. More specifically, as illustrated in the embodiment of FIG. 8A, posts 168' may have a circular cross-sectional shape. In addition, as illustrated in the embodiment of FIG. 8B, posts 168' may have a non-circular cross-sectional shape such as a square or rectangle. In addition, as illustrated in the embodiment of FIG. 8C, posts 168' may have a non-circular cross-sectional shape such as a polygon. It is understood, however, that posts 168' may have cross-sectional shapes other than those illustrated. By forming posts 168' of various cross-sectional shapes, a web or honeycomb structure is formed when the posts are consumed while growing the oxide, as described above.

While the above description refers to the inclusion of substrate 160 having opening 150 formed therein in an inkjet printhead assembly, as one embodiment of a fluid ejection assembly of a fluid ejection system, it is understood that substrate 160 having opening 150 formed therein may be incorporated into other fluid ejection systems including non-printing applications or systems as well as other applications having fluidic channels through a substrate, such as medical devices or other micro electro-mechanical systems (MEMS devices). Accordingly, the present invention is not limited to printheads, but is applicable to any slotted substrates. In addition, while the above description refers to routing fluid or ink through opening 150 of substrate 160, it is understood that any flowable material, including a liquid such as water, ink, blood, photoresist, or organic light-emitting materials or flowable particles of a solid such as talcum powder or a powdered drug, may be fed or routed through opening 150 of substrate 160.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of forming an opening through a substrate having a first side and a second side opposite the first side, the method comprising:

forming spaced etch stops in the first side of the substrate, including growing the spaced etch stops in and consuming portions of the substrate;

etching into the substrate from the second side toward the first side to the spaced etch stops, including forming a first portion of the opening; and etching into the substrate between the spaced etch stops from the second side through the first portion of the opening to the first side, including forming a second portion of the opening.

2. The method of claim 1, wherein forming the first portion of the opening includes forming the first portion of the opening to the spaced etch stops, and wherein forming the second portion of the opening includes forming the second portion of the opening between the spaced etch stops.

3. The method of claim 1, wherein forming the spaced etch stops includes forming spaced slots in the first side of the substrate and forming the spaced etch stops in the spaced slots.

4. The method of claim 3, wherein forming the spaced slots includes forming a first plurality of slots and a second plurality of slots spaced from the first plurality of slots.

5. The method of claim 4, wherein forming the first plurality of slots and the second plurality of slots each include selectively removing spaced portions of the substrate from the first side and defining a post extending to the first side between two of the spaced portions.

6. The method of claim 5, wherein the substrate is formed of silicon, and wherein forming the spaced etch stops includes growing an oxide in the spaced portions and consuming the post with the oxide.

7. The method of claim 5, wherein the post has a circular cross-section.

8. The method of claim 5, wherein the post has a non-circular cross-section.

9. The method of claim 3, wherein forming the spaced etch stops further includes forming the spaced etch stops from portions of the substrate adjacent the spaced slots.

10. The method of claim 3, wherein the substrate is formed of silicon, and wherein forming the spaced etch stops includes growing an oxide in the spaced slots.

11. The method of claim 10, wherein growing the oxide in the spaced slots includes filling the spaced slots with the oxide and consuming portions of the substrate adjacent the spaced slots with the oxide.

12. The method of claim 3, wherein fanning the spaced slots includes forming the spaced slots of varying width.

13. The method of claim 12, wherein forming the spaced slots of varying width includes forming the spaced slots of varying depth.

14. The method of claim 3, wherein forming the spaced slots includes etching into the substrate from the first side.

15. The method of claim 14, wherein etching into the substrate from the first side includes dry etching into the substrate.

16. The method of claim 15, wherein dry etching into the substrate includes deep reactive ion etching into the substrate.

17. The method of claim 1, wherein etching into the substrate and forming the first portion and the second portion of the opening includes dry etching into the substrate.

18. The method of claim 17, wherein dry etching into the substrate includes deep reactive ion etching into the substrate.

19. The method of claim 1, wherein forming the spaced etch stops includes defining a maximum dimension of the second portion of the opening.

20. A method of forming a substrate for a fluid ejection device, the method comprising:
    forming spaced slots in a first side of the substrate;
    forming spaced etch stops in the spaced slots;
    etching a first portion of a fluidic channel into the substrate from a second side opposite the first side to the spaced etch stops; and
    etching a second portion of the fluidic channel into the substrate between the spaced etch stops from the second side through the first portion of the fluidic channel to the first side.

21. The method of claim 20, wherein forming the spaced slots includes forming a first plurality of slots and a second plurality of slots spaced from the first plurality of slots in the first side of the substrate.

22. The method of claim 21, wherein forming the first plurality of slots and the second plurality of slots each include selectively removing spaced portions of the substrate from the first side and defining a post extending to the first side between two of the spaced portions.

23. The method of claim 22, wherein the substrate is formed of silicon, and wherein forming the spaced etch stops includes growing an oxide in the spaced portions and consuming the post with the oxide.

24. The method of claim 22, wherein the post has a circular cross-section.

25. The method of claim 22, wherein the post has a non-circular cross-section.

26. The method of claim 20, wherein forming the spaced etch stops further includes forming the spaced etch stops from portions of the substrate adjacent the spaced slots.

27. The method of claim 20, wherein the substrate is formed of silicon, and wherein forming the spaced etch stops includes growing an oxide in the spaced slots.

28. The method of claim 27, wherein growing the oxide in the spaced slots includes filling the spaced slots with the oxide and consuming portions of the substrate adjacent the spaced slots with the oxide.

29. The method of claim 20, wherein forming the spaced slots includes forming the spaced slots of varying width.

30. The method of claim 29, wherein forming the spaced slots of varying width includes forming the spaced slots of varying depth.

31. The method of claim 20, wherein forming the spaced slots includes etching into the substrate from the first side.

32. The method of claim 31, wherein etching into the substrate from the first side includes dry etching into the substrate.

33. The method of claim 32, wherein dry etching into the substrate includes deep reactive ion etching into the substrate.

34. The method of claim 20, wherein etching the first portion and the second portion of the fluidic channel into the substrate includes dry etching into the substrate.

35. The method of claim 34, wherein dry etching into the substrate includes deep reactive ion etching into the substrate.

36. The method of claim 20, wherein forming the spaced etch stops includes defining a maximum dimension of the second portion of the fluidic channel.

* * * * *

UNITED STATES PATENT AND TRADEMARK OFFICE
CERTIFICATE OF CORRECTION

PATENT NO. : 7,282,448 B2  Page 1 of 1
APPLICATION NO. : 11/211390
DATED : October 16, 2007
INVENTOR(S) : Chien-Hua Chen et al.

It is certified that error appears in the above-identified patent and that said Letters Patent is hereby corrected as shown below:

In column 11, line 46, in Claim 12, delete "fanning" and insert -- forming --, therefor.

Signed and Sealed this

Thirtieth Day of June, 2009

JOHN DOLL
*Acting Director of the United States Patent and Trademark Office*